(12) United States Patent
deGouvea-Pinto et al.

(10) Patent No.: US 8,118,916 B2
(45) Date of Patent: Feb. 21, 2012

(54) HIGH CAPACITY MATERIALS FOR CAPTURE OF METAL VAPORS FROM GAS STREAMS

(75) Inventors: Neville R. deGouvea-Pinto, Loveland, OH (US); Malyuba Abu-Daabes, Amman (JO)

(73) Assignee: The University of Cincinnati, Cincinnati, OH (US)

( * ) Notice: Subject to any disclaimer, the term of this patent is extended or adjusted under 35 U.S.C. 154(b) by 1436 days.

(21) Appl. No.: 11/550,927

(22) Filed: Oct. 19, 2006

(65) Prior Publication Data
US 2007/0123660 A1 May 31, 2007

Related U.S. Application Data

(60) Provisional application No. 60/729,350, filed on Oct. 21, 2005.

(51) Int. Cl.
*B01D 53/14* (2006.01)

(52) U.S. Cl. ............... 95/234; 95/133; 95/134

(58) Field of Classification Search .......... 95/234, 95/134, 133, 230; 423/99, 107, 210; 210/679, 210/914, 134, 234; 252/181.1–181.7
See application file for complete search history.

(56) References Cited

U.S. PATENT DOCUMENTS

| | | | | |
|---|---|---|---|---|
| 3,755,161 | A * | 8/1973 | Yokota et al. ............ | 210/679 |
| 4,233,274 | A * | 11/1980 | Allgulin .................. | 423/210 |
| 2002/0169071 | A1* | 11/2002 | Sauvage et al. ............ | 502/150 |
| 2004/0007693 | A1* | 1/2004 | Moulton ................. | 252/364 |
| 2004/0257633 | A1* | 12/2004 | Agrawal et al. ............ | 359/265 |
| 2005/0218381 | A1* | 10/2005 | Maruyama et al. .......... | 252/500 |
| 2006/0060817 | A1* | 3/2006 | Tempel et al. ............ | 252/181.3 |
| 2006/0069169 | A1* | 3/2006 | Li et al. .................. | 518/726 |

OTHER PUBLICATIONS

Malyuba A. Abu-Daabes and Neville G. Pinto, "Synthesis and characterization of a nano-structured sorbent for the direct removal of mercury vapor from flue gases by chelation", Jan. 28, 2005, Chemical Engineering Science, vol. 60, pp. 1901-1910.*
Malyuba Ali Abu-Daabes, "Synthesis and Characterization of Nano-Structured Chelating Adsorbents for the Direct Removal of Mercury Vapor from Flue Gases", Nov. 1, 2004.*
Becker, NSC, et al., "Selective recovery of mercury(II) from industrial wastewaters: Use of a chelating ion exchanger regenerated with brine", Reactive Polymers, 21 (1993) 5-14, Elsevier Science Publishers B.V., Amsterdam.
Kara, A, et al., "Poly(ethylene glycol dimethacrylate-n-vinyl imidazole) beads for heavy metal removal", Journal of Hazardous Materials 106B (2004) 93-99, Elsevier B.V.
Liu, R, et al., "Removal of Cu(II), Cd(II) and Hg(II) from waste water by poly(acrylaminophosphonic)-type chelating fiber", Chemosphere, vol. 38, No. 13, pp. 3169-3179, 1999, Elsevier Science Ltd.
Say, R, et al., "Novel methacryloylaminidophenylalanine functionalized porous chelating beads for adsorption of heavy metal ions", Advances in Polymer Technology, vol. 22, No. 4, 355-364 (2003), Wiley Periodicals, Inc.

(Continued)

*Primary Examiner* — Duane Smith
*Assistant Examiner* — Thomas McKenzie
(74) *Attorney, Agent, or Firm* — Wood, Herron & Evans, LLP

(57) ABSTRACT

Metal ions are adsorbed or absorbed by a combination of a binding ligand and an ionic liquid effective to dissolve the metal complex. The ligand is preferably bound to a solid surface which is coated with the ionic liquid. This method is particularly suitable for adsorbing gaseous mercury, lead, zinc and cadmium.

20 Claims, 2 Drawing Sheets

OTHER PUBLICATIONS

Vidic, RD, et al., "Vapor-phase elemental mercury adsorption by activated carbon impregnated with chloride and chelating agents", Carbon 39 (2001) 3-14, Elsevier Science Ltd.

Lei Ji, Novel Nano-Structured Sorbents of Elemental and Oxidized Mercury Removal from Flue Gas, Dissertation to Division of Graduate Studies and Research of the University of Cincinnati, 2008, 218 pp.

* cited by examiner

HIGH CAPACITY MATERIALS FOR CAPTURE OF METAL VAPORS FROM GAS STREAMS

RELATED APPLICATION

This application is related to and claims the benefit of U.S. Provisional Patent Application Ser. No. 60/729,350, filed on Oct. 21, 2005, the disclosure of which is incorporated herein by reference.

BACKGROUND OF THE INVENTION

Risk assessment studies performed by the United States Environmental Protection Agency (EPA) for hazardous air pollutants (HAPS) emitted from coal-fired power plants have identified mercury as the HAP of most concern (USEPA, 1997). US coals typically contain 10-120 ppbw mercury. It is estimated that coal-fired power plants emit approximately 48 tons of mercury annually, or about one-third of the total US anthropogenic mercury emissions. Mercury released from coal during combustion exists as $Hg^0$ at high furnace temperatures. After leaving the high-temperature furnace environment, homogeneous as well as heterogeneous oxidations convert a portion of the $Hg^0$ to $Hg^{2+}$.

Two general approaches based on the use of sorbents have been pursued for the removal of mercury at particulate control devices. One approach uses upstream (furnace) injection of the sorbent. In a study on emissions from burning a blend of Ohio 5, 6 and 7 coal, upstream injection with two sorbents (lime and carbon) was demonstrated to remove between 41% and 53% of total (particulate+vapor) mercury, which implies that ⅓ or less of the vapor-phase mercury was removed. The second approach has been to use sorbents at various locations downstream of the boiler. A variety of sorbents including carbon, fly ash, and minerals have been studied, and fixed-bed, fluidized-bed and direct-injection contacting schemes have been proposed. Carbon and chemically modified carbons have been extensively researched. The chemically modified carbons are impregnated with chlorine, sulfur or iodine to improve adsorption characteristic. Problems with very low capacity, poor mixing and low thermal stability make the carbon injection approach very expensive. The US Department of Energy (DOE) estimates the projected cost for 90% mercury control to be between $25,000 to $70,000 per lb Hg removed. Others examined various sorbents including chemically promoted activated carbons and metal oxides and sulfides for their capability to remove elemental mercury from flue gases. The results showed that activated carbon treated with hydrochloric acid is most promising with an adsorption capacity of 4.0 mg Hg/g. Molybdenum disulfide ($MoS_2$) displayed a large capacity (8.8 mg Hg/g) for elemental mercury, but is known to be expensive and unstable at elevated temperatures.

SUMMARY DESCRIPTION OF THE INVENTION

A new class of activated materials has been invented for the adsorption or absorption of metal vapors from gases. This class of materials can be synthesized in forms including but not limited to particulate, membrane, films, coatings, fibers, cloth, colloidal drops and reverse micelles. The materials can be used for a variety of applications that include but are not limited to selective chemical separations, gas purifications, metal vapor capture, chemical sensing, and a wide range of analytical chemical methods. The combination of binding ligands with ionic liquids provides a chemical environment (interface or bulk) that adsorbs or absorbs metal vapors.

The invention will be further appreciated in light of the following detailed description and drawings.

DETAILED DESCRIPTION OF THE INVENTION

Figure 1:
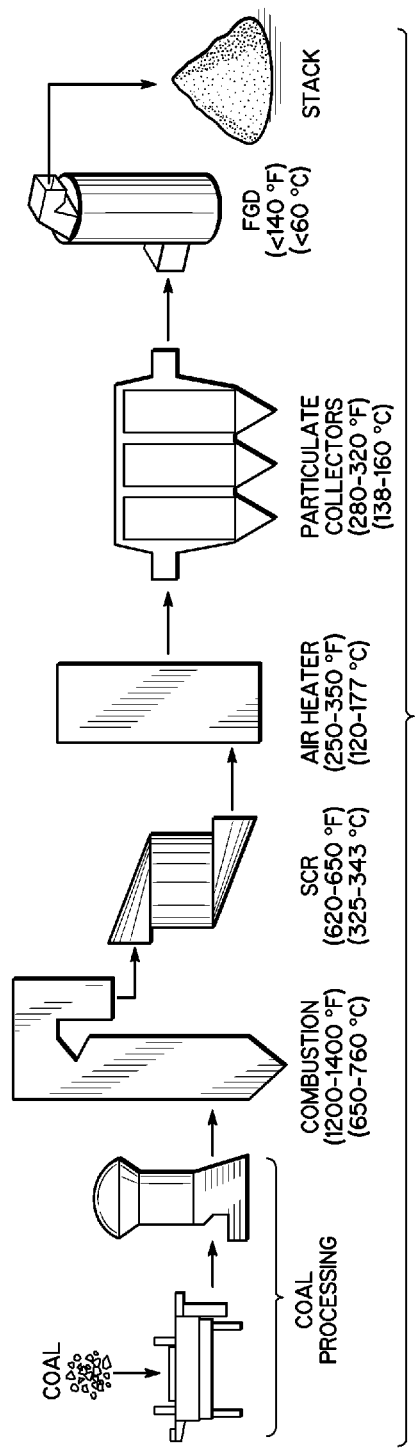
FIG. 1 is a schematic representation of flue gas temperatures found in power plant control units.

The present invention is a ligand which binds or adsorbs a metal atom in combination with an ionic liquid. In its most common form, a binding ligand is immobilized on the surface of a solid and is coated in a layer (nanolayer or thicker) of the ionic liquid. The ionic liquid is a chemically active environment for solubilization or reaction with the metal vapor. For example, oxidized metals can be made to absorb with high affinity for subsequent chelation, and elemental metals can be oxidized by the layer prior to adsorption on the ligand. The affinity, selectivity, capacity, contacting configuration, etc., of the material can be tailored based on the selection of the solid, the ionic liquid and the chelating ligand. A wide variety of combinations of ionic liquids, chelating agents or other ligands, and solid supports can be used together, as well as the ionic liquid/ligand combination independent of a solid substrate will function to adsorb/absorb metal atoms in a gaseous stream. One exemplary gaseous stream is that found in a power plant, such as a coal burning power plant. With reference to FIG. 1, in one embodiment, solubilization takes place at temperatures from less than 60° C. to 160° C. As shown, these temperatures may be observed in particle collectors or the FGD of the power plant. In another embodiment, solubilization occurs at a temperature up to 325° C. Accordingly, solubilization may occur in an air heater or SCR of a power plant. However, the invention applies to any temperature, pressure or chemical environment for which this combination of materials can be developed.

For use in the present invention, the term "ionic liquid" is defined as a liquid that contains only ions. It is used in its broadest sense to include room temperature ionic liquids, ionic melts, and molten salts. For purposes of the present invention "chelating agent" is defined as a ligand that attaches to a metal ion by two or more donor atoms. In the present invention, chelating ligands which attach to mercury ions have been disclosed. A wide variety of ligands can be used depending upon the particular metal employed and the particular environment.

Unidentate ligands such as mercaptopropyltrimethoxysilane which binds mercury are also suitable for use in the present invention. Ligands with sulfur (e.g., S present in thiols, thiocarbamates, thioethers), nitrogen (e.g., N present in amines, azo groups, amides, nitriles), and oxygen (e.g., O present in carboxylic, hydroxyl, phenolic, ether, carbonyl, phosphoryl groups) as donor atoms are known to form stable complexes with trace elements. Soft sphere (B-type) cations such as, $Hg^{2+}$, $Pb^{2+}$, $Zn^{2+}$, and $Cd^{2+}$ tend to form covalent bonds and possess strong affinity for intermediate (N) and soft (S) ligands. On the other hand, hard cations, such as $Ca^{2+}$ and $Mg^{2+}$, preferentially react via electrostatic interactions and form complexes with only hard oxygen ligands. The affinity of a ligand for mercury soft metal ion increases with the overall softness of the donor atoms following the order: (S,N)>(N,N)>(N,O)>(O,O).

Figure 3:
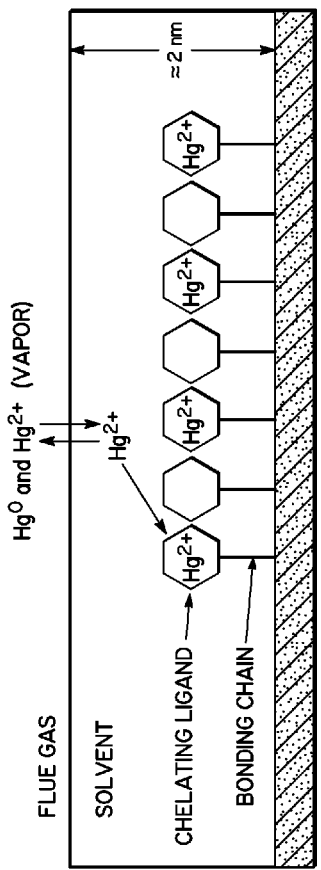
FIG. 3 is a schematic representation of a chelating adsorbent for vapor phase mercury.
Figure 2:
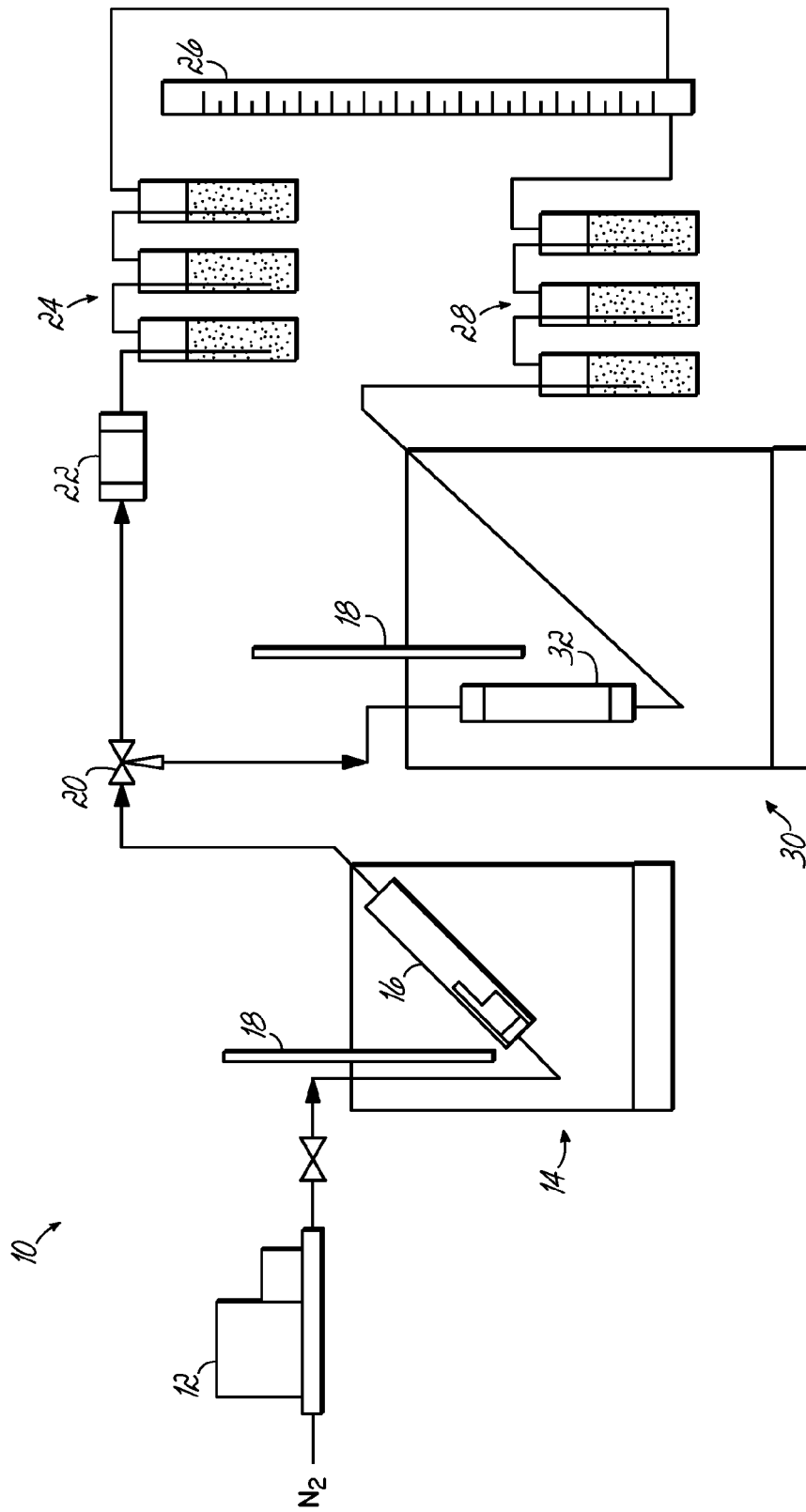
FIG. 2 is a diagrammatic depiction of a test apparatus.

The invention is particularly useful for the capture of oxidized (Hg2+) and elemental mercury (Hg0). This is illustrated in FIG. 3. For oxidized mercury, the ionic liquid methylpolyoxyethylene(15)octadecammonium chloride can be used in combination with a number of ligands. For elemental mercury capture, the oxidizing ionic liquid pyrrolidinium bis(trifluoromethane sulfonyl)imide salt is preferred. It has been demonstrated that elemental mercury is captured in this ionic liquid due to simultaneous oxidation and solvation. Furthermore, the use of additives to further enhance the reactive environment in the ionic liquid has also been demonstrated. For example, KMnO4 (up to 0.25 mmole) has been used as an additive to enhance the oxidation of elemental mercury.

Chelates and other ligands most often involve the metal in ionic form. A chelating ligand can complex with a metal ion through covalent (coordinate) bonds with two or more donor groups, so that one or more rings are formed. Some chelating ligands will form an additional electrovalent bond between the metal ion and charged groups on the chelate. This bond adds stability to the complex. Thus, to implement chelation for the removal of metals from gases by an adsorbent, the desired goal is to provide conditions at the surface suitable for ionization of the metal to the chelating ligand.

Formation of the immobilized metal-ligand complex (chelate) results from absorption and ionization of the metal salt in the surface layer, followed by complexation of metal ion with the ligand to form the chelate. The concept was tested for the removal of mercuric chloride from the gas phase, though it is not limited to the capture of this material and is seen as a useful new method for metal vapor capture. The synthesis procedures used is described, and detailed characterization data are reported.

EXAMPLE

Materials

The substrate used in this study is silica gel Grade 62 with a mesh size of 60-200 and an average pore size of 150 Å (Davison Chemical, Maryland, USA). Nitric acid, sulfuric acid, hydrochloric acid, dichloromethane, potassium chloride, and toluene were purchased from Fisher Scientific (Pittsburgh, Pa.). Dichloromethane, 3-aminopropyltriethoxysilane (APTS), disodium hydrogen phosphate, glutaraldehyde (50 wt % in water), cysteine hydrochloride monohydrate, anhydrous borax, sodium borohydride, and 6-aminocaproic acid (6-AA) were purchased from Sigma-Aldrich, Inc. (Milwaukee, Wis.). The molten salt methylpolyoxyethylene(15)octadecanammonium chloride (MEC) was a gift from Akzo Nobel Chemicals (McCook, Ill.). All chemicals were used as received, except toluene was dried with 4 Å molecular sieves (Fisher Scientific, Pittsburgh, Pa.) prior to use.

Five grams of silica gel were dried overnight in a vacuum oven at 170° C. The silica was then hydroxylated under total reflux in a mixture of 25 ml of 6 M nitric acid and 25 ml of 6 M sulfuric acid at 100° C. for 12 h. The residue was washed with distilled water by decantation until a neutral pH was achieved, and then dried overnight in a vacuum oven at 110° C.

Cysteine was selected as the chelating agent, and bonded in a self-assembled monolayer (SAM) on the silica substrate. The dry acid-washed silica gel was suspended in 100 ml dry toluene and 4 ml of APTS under nitrogen at 100° C. for 6 h with total reflux. The mixture was allowed to cool to room temperature before it was filtered. In dry toluene, most of the APTS is adsorbed on the silica surface through hydrogen bonding between the amine group and the silica hydroxyl groups followed by the release of an alcohol. The solid product was transferred to a Soxhlet apparatus, and was extracted with 200 ml dry toluene at 150° C. for 2 days. The solid product was then removed and thermally cured under vacuum at 145° C. for 15 h.

In the second step, glutaraldehyde was attached to the amine group of APTS via Schiff base reaction. The silica gel was suspended in 15 ml of 0.1 M disodium hydrogen phosphate. The pH was adjusted to 7, and the system was purged with argon. Seven milliliters of an aqueous 25 wt % glutaraldehyde solution was added and the mixture was stirred for 1.5 h at room temperature in an argon atmosphere. The solid product, which was orange-tan in color, was collected by filtration and washed repeatedly.

Cysteine was immobilized on the surface through linkage with the aldehyde group, also by Schiff base reaction. 1.73 g of cysteine hydrochloride monohydrate was added to 10 ml of saturated borax solution under nitrogen in a glove box, and the pH was adjusted to 8.56. The wet, solid product was added to the cysteine solution and the mixture was heated to 65° C. for 2 h in an argon atmosphere. The solid product was washed and filtered several times with deionized water before it was re-suspended in 10 ml of 1.32 M sodium borohydride for 1 h, to reduce the C$=$N— to C—NH—. Subsequently, the solid was washed twice and suspended in 10 ml of 1 M HCl solution for 15 min followed by 5 washings with water. The solid product was dried under vacuum at room temperature. Weight analysis of the product gave yields in the range of 50-70%.

Studies for the effect of spacer were performed with 6-AA, a 6-carbon spacer. Two grams of 6-AA dissolved in 60 ml deionized water was added to the wet aldehyde residue from the second stop in the procedure described above. The pH was adjusted to 8.5 and the reaction was allowed to proceed for 24 h at room temperature. The product was washed and filtered 6 times, before immobilization of cysteine as described above.

A method for coating both unmodified silica and cysteine activated silica with a molten salt was developed using a rotary vacuum evaporator (Büchi Rotavapor R-205, Brinkmann Instruments, Inc., Westbury, N.Y.). To optimize the coating thickness, unmodified silica was coated with different weight ratios in the range of 10-40 wt % of molten salt. For the 40 wt % coating, 2 g of molten salt was dissolved in 100 ml dichloromethane and added to 3 g of unmodified silica gel in a 200 ml evaporation flask. The mixture was rotated at 25 rpm for 2 h at room temperature, before it was heated to 60° C. to gradually evaporate the dichloromethane.

Fourier transform infra-red (FTIR) spectroscopy was used in the range 4000-400 $cm^{-1}$ to study the surface chemistry of the adsorbent (Perkin-Elmer Spectrum One, Perkin-Elmer Life and Analytical Sciences, Inc., Boston, Mass.). Far-FTIR in the range of 100-700 $cm^{-1}$ was used on a fully functionalized adsorbent to study complex formation between mercury and cysteine ligands. Far FTIR was performed with a Nicolet Nexus FTIR (Thermo Nicolet, Madison, Wis.) purged with dry nitrogen, using DTGS polyethylene detector and solid substrate beam-splitter. The adsorbent sample was pressed onto a microporous polyethylene substrate for analysis by transmission.

Coating uniformity was studied with scanning electron microscopy (Cambridge S-90B). Nitrogen adsorption-desorption measurements were performed on a Micromeritics ASAP-2000 (Micromeritics Instrument Corporation, Norcross, Ga.). The adsorption isotherm was used to calculate the BET surface area and pore volume. The average pore diameter was estimated from the mesopore volume and the measured BET surface area following the Gurvitsch approach (Selvam et al., 2001), which is based on the relation: $D_{4V/A}=4V_P/A$, where $V_P$ is the mesopore volume and A is the specific surface area. The desorption isotherm was used to obtain the pore-size distribution using the BJH method (Rouquerol et al., 1999).

The thermal stability of the adsorbent was evaluated using thermogravimetric analysis (TGA) (SDT 2960 Simultaneous DSC-TGA, TA Instruments, New Castle, Del.). The temperature history involved heating the sample at 5° C./min to 200° C., and holding at this temperature for 1 h.

Elemental analysis was used to estimate the density of the active sites on the silica surface. C, H and N wt % were determined using a Perkin Elmer 2400 CHN analyzer (Perkin-Elmer Life and Analytical Sciences, Inc., Boston, Mass.). S wt % was determined using both Dionex DX-120 ion-chromatography (Dionex Corporation, Sunnyvale, Calif.) and titration. The titration was performed as follows: the sample was prepared via United States Pharmacopeia oxygen flask combustion method (United States Pharmacopeia, 1995). Using a microburet, the sample was titrated with sulfate titrant (0.00333 M barium acetate volumetric solution) to a sky blue color with dimethylsulfonazo III indicator solution.

The fixed-bed apparatus 10 shown schematically in the Figure was built to evaluate mercuric chloride capture by the adsorbent. The assembly consists of a custom-blown glass cell 16 in which a diffusion vial (VICI Metronics, Poulsbo, Wash.) containing mercuric chloride solid is sealed. The vial sits in a central cylindrical section of the cell. This section is connected at both ends to narrower glass tubing and is immersed in a constant temperature oil bath 14 which was maintained at 51±1° C. as measured by thermometer 18. The glass tubing is connected to the rest of the apparatus using PTFE tubing and fittings. Nitrogen (pp. grade) is metered into the mercuric chloride generation cell 16 with a mass flow controller 12 at 113 ml/min. The carrier nitrogen with vaporized mercuric chloride then passes through a three-way valve 20. One valve outlet is plumed to a glass column 32 (25 mm×3 mm ID) packed with a 103 mg bed of adsorbent. The column is in an oven 30 at 100° C.±2° C. Effluent from the bed passes through a series of 30 ml midget impingers with coarse fritted cylinders 28 (Chemglass, Vineland, N.J.) filled with 1 M KCl. Mercuric chloride is absorbed in the KCl solution; a 1 h sampling time was used.

The second outlet of the three-way valve is used to measure the inlet concentration of mercuric chloride to the packed bed. It is connected to an identical series of impingers 24 through a flow restrictor 22. Because of the high-pressure drop across the packed bed, it is essential to use flow restrictor 22 so as to ensure comparable linear velocities in the mercuric chloride generator at both settings of the three-way valve. The volumetric flow rate at the exit was measured with a bubble flow meter 26. All glass contact surfaces at the downstream of the $HgCl_2$ vapor generator are made from Teflon or glass to ensure inertness toward mercury. Also, all connecting lines downstream of the mercuric chloride vapor generator were heated to approximately 120° C. using heating tape, to prevent vapor condensation.

The amount of mercuric chloride captured in the sampling impingers 28 was determined using a cold-vapor atomic absorption analyzer (Buck Scientific Mercury Analyzer, Model 400A, East Norwalk, Conn.) following the Ontario Hydro Method (ASTM D6784-02, 2002). The input stream concentration was measured continuously for three days in order to ensure a constant $HgCl_2$ input concentration.

A key feature of the chelating adsorbent is the presence of an ionizing coating of solvent. This solvent must ideally have a very low vapor pressure at the temperature range of interest, a high solubility for the metal, good wetting characteristics for the substrate, and exhibit high chemical stability (to oxidation and reduction). Possible interferences by other components of the gas must also be minimal. The molten organic salt MEC was investigated as an ionizing coating for $HgCl_2$ removal.

Scanning electron microscope (SEM) pictures of cysteine activated silica coated with MEC show good coating uniformity at a micron scale. This implies good wettability of the activated substrate with MEC; poor wettability would be evident with patchy surface appearance on the micrographs.

In coating the cysteine activated support it is important to maintain a high accessible surface area for mercury chelation. A coating process that results in pore filling, as opposed to thinly coating the pore surface (approximately 1-2 nm), is undesirable. It will reduce the effective surface area of the substrate, and hence the adsorption capacity. To investigate pore filing, the BET surface area and the pore-size distribution were measured for different loading levels of the solvent. It is observed that as the concentration of the solvent is increased from 0% to 40%, the BET surface area decreases and the mean pore size increases slightly. This suggests that the loss of BET surface area is due to filling of smaller pores in the substrate as the solvent concentration increases. It is therefore important to identify solvent concentration limits that will define the minimum acceptable active surface area and the minimum coating thickness.

It is observed that the decrease in the cumulative pore volume is linearly proportional to the weight percent of the coating solvent. This indicates that the rotary evaporation technique resulted in a uniform coating layer of the MEC solvent on the silica surface. The thickness was estimated from the mass of the coating material and the BET area, assuming a uniform coating thickness. The optimal concentration of the solvent in the coating process is in the range of 20-30 wt % solvent, in order to give a coating thickness of about 1-2 nm and a surface area in the range of 120-170 $m^2/g$.

TGA was performed on the fully activated adsorbent to establish the upper temperature limit for the adsorbent. Two peaks were observed in the derivative curve corresponding to two desorption processes in different temperature ranges. TGA was also performed on pure silica coated only with MEC solvent. From this derivative curve it is evident that a desorption process is taking place in the same temperature range (30-100° C.) as the first peak for the fully activated adsorbent. In this range, physically adsorbed water is reported to be removed. The water loss corresponds to a weight loss of approximately 2%.

The weight loss for the fully functionalized silica in the temperature range of 160-180° C. does not originate from the MEC coating layer, and is more likely to be due to degradation in the bonded phase. Further, the MEC coating is thermally stable in the temperature range of 25-200° C.

More extensive thermal stability studies were performed on the chelating adsorbent, in order to identify the bonds lost above 160° C. Cysteine activated adsorbent was placed in an oven at 160±3° C. for 24 h before elemental analysis. The S and N concentrations show that heating the adsorbent to 160° C. resulted in approximately a 45% loss of cysteine surface coverage and only a 5% loss in the APTS concentration.

Therefore, a significant loss of the adsorbent capacity is expected at operating temperatures above approximately 150° C.

To establish the upper operating temperature limit of the adsorbent, cysteine functionalized silica was heated in a TGA from room temperature to 135° C. at 5° C./min, and held at this temperature for 5 h. Excellent thermal stability of the adsorbent at or below 135° C. was observed. The functionalized adsorbent was also exposed to 135° C. in an oven for 18 h. The material was scanned with FTIR before and after the exposure. The results indicate no significant change in the structure of the active layer. Based on these results, it is expected that the adsorbent will operate stably at flue-gas temperatures below 135° C.

The fully activated silica synthesized with 25 wt % MEC solvent was selected for the dynamic adsorption capacity measurements. Based on the BET results, the thickness of the coating layer is estimated to be about 1.24 nm. Conditions used in the fixed-bed contactor are summarized in Table 1. The residence times in the contactor ranged from 0.1 to 0.3 s. These very short times were selected to correspond to expected contacting conditions in a flue-gas application.

TABLE 1

Experimental conditions in fixed-bed contactor

| Temperature (° C.) | Adsorbent weight (g) | Gas linear velocity (m/min) | Residence time in contactor (s) |
|---|---|---|---|
| 98 | 0.1009 | 4.71 | 0.3 |
| 110 | 0.1026 | 12.05 | 0.1 |
| 130 | 0.1053 | 15.90 | 0.1 |

A typical effluent concentration history for $HgCl_2$ was developed. This experiment was at 110° C. with $HgCl_2$ feed concentration of 219 ppbw (31 ppbv). Other experiments were performed in the range from 15-450 ppbw with similar results. The effluent concentration data are reported as a ratio of the effluent $HgCl_2$ concentration to the feed $HgCl_2$ concentration. This was constantly below 0.2, and, generally, below 0.1. After 29 days of continuous operation there is no sign of pollutant breakthrough; i.e., adsorbent saturation. This corresponds to a dynamic operating capacity of at last 12 mg $Hg^{2+}$/g adsorbent. It is worth repeating that this dynamic capacity was obtained with a gas residence time of 0.1 s in the adsorber. The rapid uptake is attributed to a combination of factors: an extremely high thermodynamic driving force for adsorption due to the use of chelation with a very high K, the selection of an ionic melt with very high affinity for $HgCl_2$, careful control of the active-layer thickness, and the use of a substrate with the proper pore-size and surface-area characteristics for the application.

The small amount of mercury detected in the effluent, average value of $C/C_O=0.06$, is due to the channeling in the relatively short bed of non-uniform granules. A test for this is to change the feed concentration and observe the $C/C_o$. If this ratio does not change significantly, the leakage is attributed to channeling. Such an experiment was performed, using three feed concentrations in the range 15-452 ppbw, and the results confirmed the presence of channeling. The beds used in these studies were packed dry and manually. This approach is known to give non-uniform packing densities that cause channeling, especially if granules of non-uniform geometries and sizes are used, as is the case here. Extremely uniform beds can be obtained using high-pressure slurry packing. As indicated in Table 1, long-term dynamic capacity experiments were also run at two other temperatures (98 and 130° C.). The uptake was equally rapid, and there was no sign of pollutant breakthrough in any of these experiments.

The present invention provides a novel chelating adsorbent for the removal of gaseous mercuric chloride directly from flue gases. The adsorbent is composed of a structured active nano-layer on a mesoporous silica substrate. Chelation is achieved through the use of a molten salt coating on an immobilized chelating group. Elemental analyses indicate that the theoretical adsorption capacity for mercury is very high, approximately 33 mg/g. The adsorbent is suited for use in the low-temperature end of the flue-gas treatment train, which a maximum operational temperature of 135° C. Evaluation of the dynamic adsorbent capacity for mercuric chloride showed very efficient uptake and a minimum operating capacity of 12 mg $Hg^{2+}$/g.

Other ligands suitable for use in the present invention to adsorb, absorb mercury include dithizone, 3-mercaptopropyltrimethoxysilane, and mercaptobenzothiazole.

Dithizone (DZ) can be chemically bonded to silica gel. The silica substrate is the same as that used for the cysteine adsorbent. First, 4 g of acid washed silica was suspended in 100 ml dry toluene and 10 ml 3-chloropropyltrimethoxysilane (OPTS) under argon at 110° C. and totally refluxed for 20 h. The solid product was filtered and transferred to a Soxhlet apparatus where it was extracted with dry toluene to remove the unreacted OPTS. The solid product was then removed and subjected to thermal curing under vacuum at 70° C. overnight. The silica with bonded OPTS (OPTS-Silica) was then added to a solution of 7 g DZ dissolved in 190 ml dry toluene in the presence of a few drops of pyridine. The pyridine is used as a scavenger for the OF ions in order to force the reaction in one direction. The reaction mixture was refluxed for about 22 hours at 113° C. Soxhelet extraction of the solid product with dry toluene was followed by washing with ethanol and water until a clear filtrate was obtained. This is to remove physically adsorbed DZ from the silica surface and to remove the pyridine-chloride salt formed during the reaction. The sample was then dried under vacuum at 80° C. The final product was brown in color.

3-mercaptopropyltrimethoxysilane (MPTS) is a unidentate ligand; i.e., it has only one donor group (—SH). However, its effectiveness in binding mercury ions and forming a stable complex from aqueous and organic solutions has been widely reported in the literature.

MPTS can be immobilized on various substrates, including silica surfaces and ordered mesoporous silica. The stoichiometric ratio between MPTS immobilized on silica surface and $Hg^{2+}$ ion is reported to be (1:1) in the aqueous phase for adsorbents with pore diameters greater than 2 nm.

MPTS adsorbent is prepared as follows. The mesoporous silica gel used as a substrate for both cysteine and dithizone adsorbents was also used as a substrate for MPTS adsorbent. 5 g of acid-washed silica was suspended in 100 ml of dry toluene and 10 ml MPTS under nitrogen. The mixture was suspended at 110° C. for 20 h under inert atmosphere. The product was filtered, and the unreacted MPTS was removed with toluene using a Soxhlet extractor. The product was then dried under vacuum at 105° C. This grafting technique is reported to maintain all thiol groups (—SH) active upon bonding, with no oxidation into noncomplexing disulfide groups (—S—S—).

2-Mercaptobenzothiazole (MBT) has been physically immobilized on different supports, including silica gel, natural clay, and polymeric resins. MBT adsorbent can be produced as follows. Silica gel was functionalized with MBT by the Mannich reaction between MBT and 3-aminopropyltriethoxysilane (APTS) modified silica gel (Pu et al., 1998). The silica gel substrate was the same as used previously for cysteine, dithizone and MPTS adsorbents. First, 4 g acid washed silica gel was reacted with 10 ml APTS in 100 ml dry toluene under argon with total reflux at 110° C. for 6 hours. The solid was then filtered and extracted with dry toluene using a Soxhlet apparatus. Silica with bonded APTS (APTS-Silica) was then thermally cured under vacuum at 133° C. for 17 hours. 8 g of MBT dissolved in a mixture of 100 ml ethanol and 6 ml formaldehyde solution was reacted with APTS-Silica at 95° C. for 17 hours. Unbound MBT was extracted from the product with ethanol using the Soxhlet apparatus, followed by drying under vacuum at 75° C.

An effort to bond MBT directly to the silica surface was made by two methods. First, MBT was impregnated on silica gel by reacting acid-washed silica with 8 g MBT dissolved in a mixture of 20 ml pyridine and 100 ml toluene, since pyridine has been reported to increase the solubility of MBT (Terada et al., 1983). The mixture was refluxed at 100° C. for 20 hours, the product was filtered and the unbound MBT was extracted with toluene solvent using the Soxhlet apparatus. The product was then dried under vacuum at 75° C. overnight.

MBT was also directly bonded to the silica surface by the condensation reaction between the ethoxy group of 6-ethoxy-2-mercaptobenzothiazole (EMBT) and the hydroxyl groups of silica gel. 4 g of acid-washed silica was added to 8 g EMBT dissolved in 200 ml pyridine. The mixture was refluxed at 110° C. for 16 hours, and the unbound EMBT was extracted using the Soxhlet apparatus. Finally, the product was dried under vacuum at 70° C. for 6 hours.

Additional test results are set forth in the following Table 2.

TABLE 2

| | Ligand | Coating | Hg Species | Hg Removal | Hg Capacity, mg Hg/g adsorbent | Significance |
|---|---|---|---|---|---|---|
| 1 | APTS-Cysteine | 25% MEC | $Hg^{2+}$ | ≧90% | >12* | Prototype adsorbent; demonstration of core concept of invention and demonstration of high capacity. |
| 2 | APTS-MBT | 25% MEC | $Hg^{2+}$ | ≧90% | >87* | Demonstration of alternative ligand and high capacity |
| 3 | CPTS-DZ | 25% MEC | $Hg^{2+}$ | ≧90% | >12* | Demonstration of alternative ligand and high capacity |
| 4 | MPTS | (None) | $Hg^{2+}$ | — | ~2 | Demonstration of alternative ligand and high capacity. In addition, this example shows that the capacity of the ligand + coating is much greater than the sum of the individual capacities |
| | | | $Hg^{2+}$ | — | ~10 | |
| | | | $Hg^{2+}$ | ≧90% | >58* | |
| 5 | MPTS | 25% $P_{14}$/$KmnO_4$ | $Hg^0$ | ≧90% | >8* | Demonstration of function of ionizing coating layer with additional oxidant added to coating. |

*Value given is lower bound; breakthrough was not observed in fixed-bed adsorption trials.
KEY:
APTS = 3-aminopropyltriethoxysilane
MBT = 2-mercaptobenzothiazole
CPTS = 3-chloropropyltrimethoxysilane
DZ = dithizone
MPTS = 3-mercaptopropyltrimethoxysilane
MEC = methylpolyoxyethylene(15)octadecanammonium chloride
$P_{14}$ = pyrrolidinium imide molten salt with 1-butyl,1-methyl pyrrolidinium cation and bis(trifluoromethane sulfonyl)imide anion This has been a description of the present invention along with the preferred method of practicing the invention. However, the invention itself should only be defined by the appended claims.

What is claimed is:

1. A method of binding metal ions comprising contacting a metal-containing vapor with an ionic liquid to absorb the metal-containing material from the vapor and binding metal ions in the ionic liquid with a binding ligand, wherein said metal ions are selected from the group consisting of mercury, lead, zinc, cadmium, calcium and magnesium.

2. The method claimed in claim 1 wherein said ligand is bound to a solid support and wherein said ionic liquid is coated onto said solid support.

3. The method claimed in claim 2 wherein said solid support comprises silica wherein said ionic liquid includes an alkyl 3 methylimidazolium cation.

4. The method claimed in claim 1 wherein said ionic liquid comprises methylpolyoxylethylene(15)octadecanammonium chloride.

5. The method claimed in claim 1 wherein said ligand is selected from the group consisting of cysteine, dithizone, 2 mercaptobenzothiazol, and 3 mercaptopropyltrimethoxysilane.

6. The method claimed in claim 1 wherein said ionic liquid includes an oxidizing agent.

7. The method claimed in claim 1 wherein said ionic liquid is pyrrolidinium bis(trifluoromethane sulfonyl)imide.

8. The method claimed in claim 1 wherein said binding ligand is a chelating ligand.

9. A method of binding metal ions from a gas comprising a metal-containing vapor comprising:
    solubilizing the metal-containing vapor in an ionic liquid, such that metal ions are formed; and
    binding the metal ions with a binding ligand bound to a solid support and coated with the ionic liquid, wherein the metal ions are one of mercury, lead, zinc, cadmium, calcium, or magnesium or combinations thereof.

10. The method of claim 9 wherein solubilizing the metal-containing vapor occurs when the metal-containing vapor is at a temperature of between about 60° C. and about 325° C.

11. The method of claim 9 wherein solubilizing the metal-containing vapor occurs when the metal-containing vapor is at a temperature of between about 60° C. and about 160° C.

12. The method of claim 9 wherein the ionic liquid comprises methylpolyoxylethylene(15)octadecanammonium chloride.

13. The method of claim 9 wherein the binding ligand is selected from the group consisting of cysteine, dithizone, 2-mercaptobenzothiazol, and 3-mercaptopropyltrimethoxysilane.

14. A method of binding mercury ions from a flue gas in a coal-burning power plant that contains mercury-containing vapor comprising:
    contacting an ionic liquid comprising methylpolyoxylethylene(15)octadecanammonium chloride or pyrrolidinium bis(trifluoromethane sulfonyl)imide with the flue gas, whereby the ionic liquid contains mercury ions from the mercury-containing vapor; and
        binding the mercury ions with a binding ligand bound to a solid support and coated with the ionic liquid.

15. The method of claim 14 wherein the binding ligand is selected from the group consisting of cysteine, dithizone, 2-mercaptobenzothiazol, and 3-mercaptopropyltrimethoxysilane.

16. The method of claim 1 wherein contacting the ionic liquid with the metal-containing vapor occurs from a time in the range of 0.1 s to 0.3 s.

17. The method of claim 9 further comprising contacting the ionic liquid with the gas for a time in the range of 0.1 s to 0.3 s prior to solubilizing the metal-containing vapor in the ionic liquid.

18. The method of claim 14 wherein contacting the ionic liquid with the flue gas occurs for a time in the range of 0.1 s to 0.3 s.

19. A method of binding metal ions comprising contacting a metal-containing vapor with an ionic liquid to absorb the metal-containing material from the vapor and binding metal ions in the ionic liquid with a binding ligand, wherein said ligand is selected from the group consisting of cysteine, dithizone, 2 mercaptobenzothiazol, and 3 mercaptopropyltrimethoxysilane.

20. A method of binding metal ions comprising contacting a metal-containing vapor with an ionic liquid to absorb the metal-containing material from the vapor and binding metal ions in the ionic liquid with a binding ligand, wherein said binding ligand is a chelating ligand.

* * * * *